Dec. 19, 1961 D. N. HURWITZ 3,013,337
NAVIGATIONAL COMPUTER AND PLOTTER
Filed Aug. 13, 1958 3 Sheets-Sheet 1

INVENTOR.
DAN N. HURWITZ
BY *Jerome A. Gross*
ATTORNEY

Dec. 19, 1961  D. N. HURWITZ  3,013,337
NAVIGATIONAL COMPUTER AND PLOTTER
Filed Aug. 13, 1958  3 Sheets-Sheet 2

INVENTOR.
DAN N. HURWITZ
BY *Jerome R. Gross*
ATTORNEY

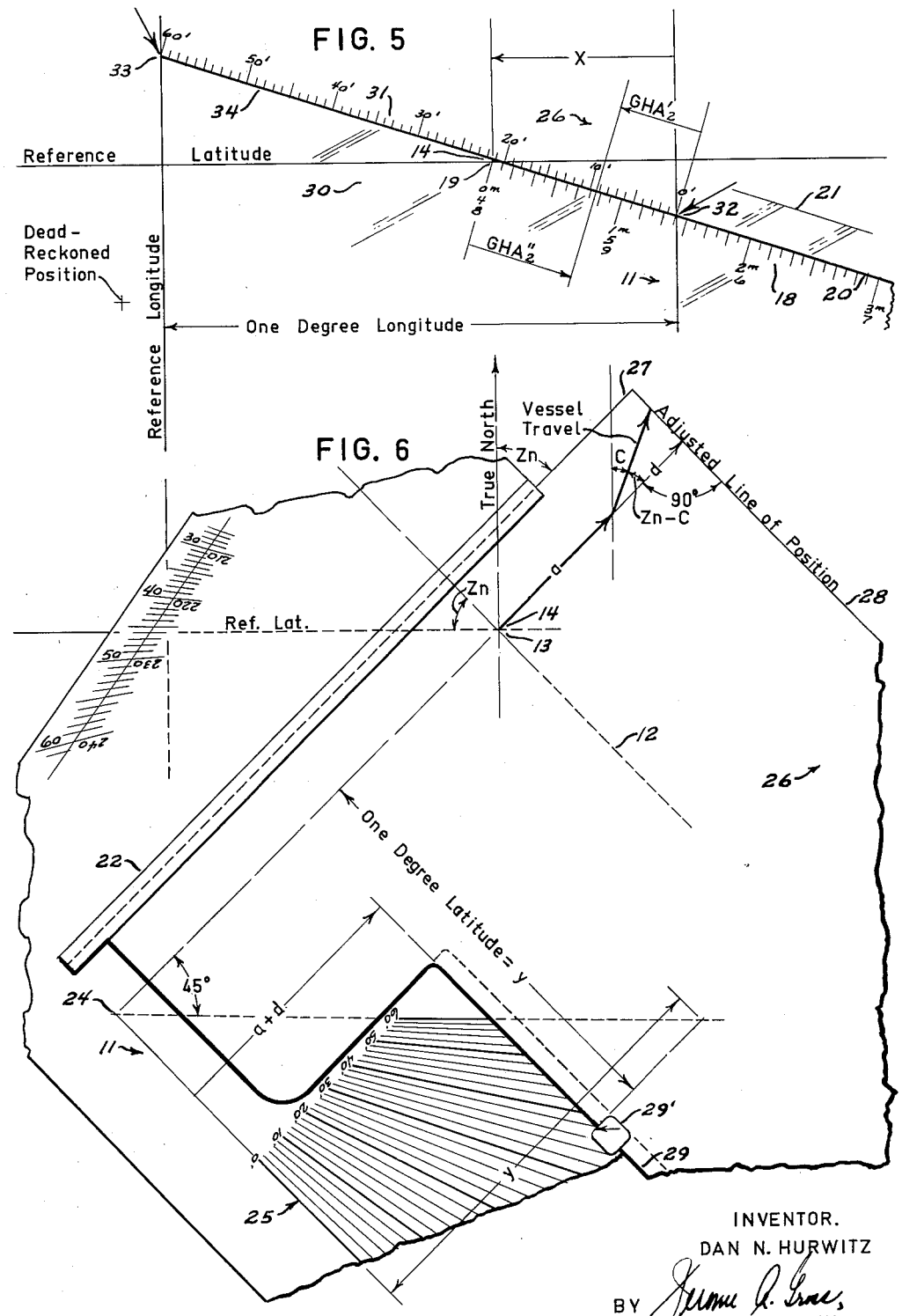

United States Patent Office 3,013,337
Patented Dec. 19, 1961

3,013,337
NAVIGATIONAL COMPUTER AND PLOTTER
Dan Norman Hurwitz, 4907 W. Pine Blvd.,
St. Louis, Mo.
Filed Aug. 13, 1958, Ser. No. 754,838
2 Claims. (Cl. 33—75)

This invention relates to a navigational computer and plotter, and particularly to providing a device adapted for use in solving problems of celestial navigation, with the accuracy required for the navigation of surface vessels, aircraft and the like.

The purposes of the present invention include the following:

To facilitate the accurate performance of all steps leading to the plotting of a line of position;

To provide an apparatus adapted for use in conjunction with presently available almanacs and sight reduction tables;

To provide mechanical means to aid in the location of an assumed position;

To provide compact plotter mechanism whereby intercept distances may be found for different scales of mercatorial charts and whereby such intercept distances are utilized in connection with assumed positions so mechanically located;

To provide, along with such plotter mechanism, for the convenient computing and recording of all data taken into account in the problem being solved; and To carry out the other purposes which will be apparent from this specification.

In the accompanying drawings:

FIGURE 5 is a diagrammatic illustration of how the present device is applied to a mercatorial chart and utilized to locate an assumed position; and FIGURE 6 shows how an adjusted line of position is plotted utilizing the present device.

Figures 1, 3:
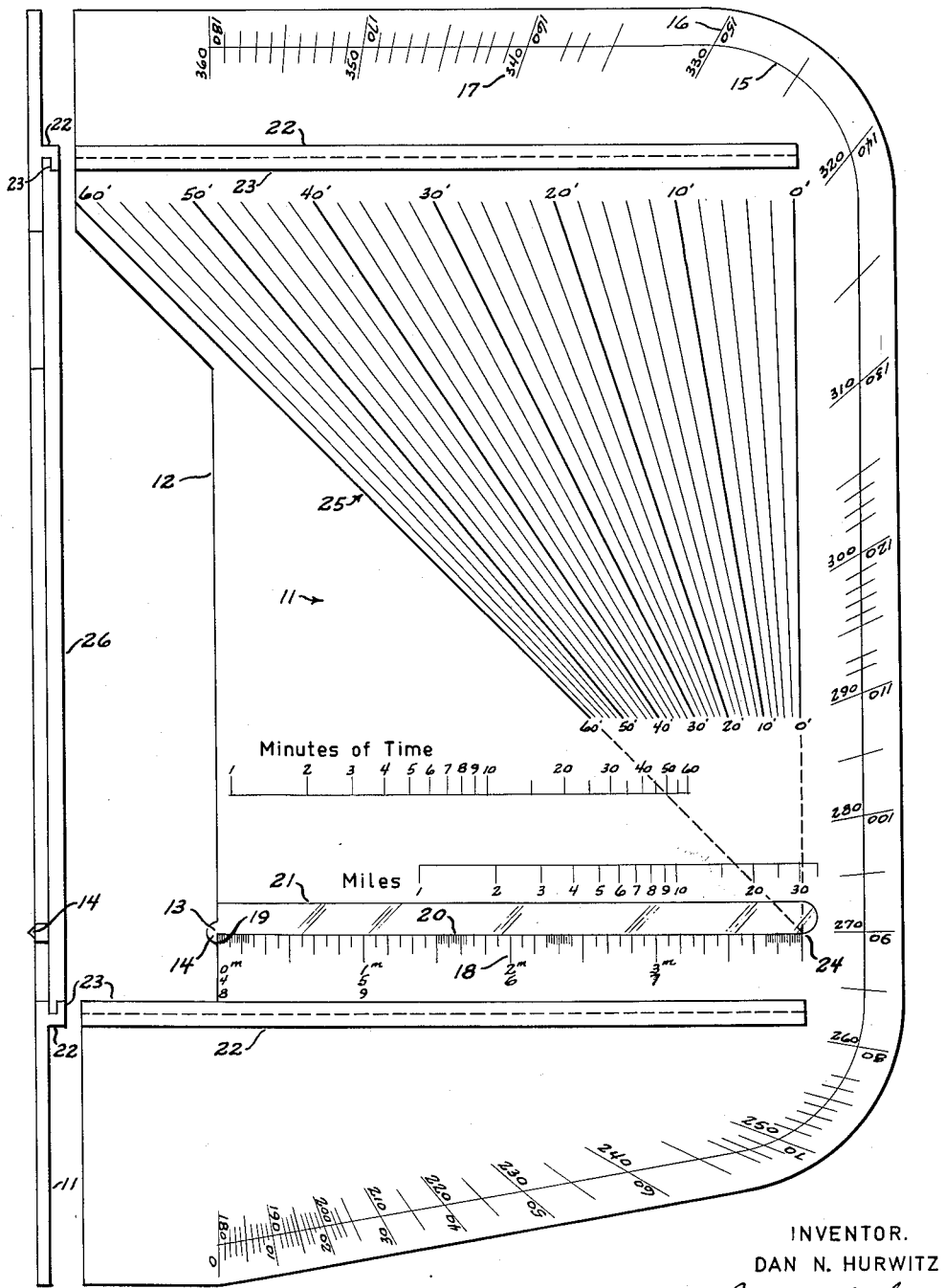
FIGURE 1 is a plan view of the protractor plate which constitutes the body member of the present device.
FIGURE 3 is an edge view showing the slide assembly.

Referring now to the figures by their detailed reference numerals, the body of the device consists of a protractor plate 11, preferably formed of a sheet of fairly rigid plastic material to an outline which may be varied for ready accommodation thereon of all the material hereafter described. In the form shown in FIGURE 1, the protractor plate 11 is nearly rectangular save for a cut-out 12 along the left side, along which cut-out a protractor center 13 is located. Preferably the protractor center includes a pivot means such as a pin 14 which projects sufficiently from the underside of the protractor plate 11 to permit it to be pivoted on a chart or plotting board.

Along the edge of the protractor plate 11 remote from the center 13 is a protractor scale 15 comprising angular gradations marked adjacent the edge and including an angle of fully 180° from the protractor center. The protractor scale 15 is a double scale, including an outer edge scale 16 ranging from 0° to 180° (arranged from the lower left, thence to the right, thence upward and thence across to the left), and an inner scale 17 similarly arranged but ranging from 180° to 360°. The numerals marking the successive graduations 0°–180° are inscribed so that each is upright when the protractor is turned so that such numerals are horizontally aligned with and to the left of the pivot. On the other hand, the numerals marking the 180°–360° graduations are each upright when the protractor is so turned that each is horizontally aligned but to the right of the pivot. Each graduation line thus represents two angles whose difference equals 180°. Furthermore, it may be convenient to provide a set of reciprocal readings opposite the principal readings on each scale 16, 17.

Aligned with the protractor center 13 and extending in the direction therefrom from the 90° gradation on the protractor scale 15, is a linear scale 18 having its zero reading point 19 aligned with (here shown coincident with) the protractor center. The scale 18 is graduated along a scale line 20 in gradations which represent minutes of time; and the length of the scale line 20 from its zero reading point 19 extends an amount graduated on its lower side to represent four minutes of time. By the manipulative processes hereinafter described, this scale may be used for all values up to ten minutes of time; and the scale markings are folded, in lengths of four minutes per marking, four minutes for the total scale length, so that a second set of markings reads four minutes to eight minutes and a third partial set of markings reads eight minutes to ten minutes as shown.

Across the scale line 20 from the graduations described, the protractor plate 11 is provided with a window 21 which extends substantially from the protractor center to beyond the four-minute graduation of the scale line 20.

Parallel to the scale line 20 which extends from the protractor center 13 toward the 90° graduation on the protractor scale 15, are arranged a pair of slide guides 22. These may project from the upper surface of the protractor plate 11 for holding thereon the protractor slide, as shown in FIGURE 3. For this purpose each slide guide 22 is provided with an overhang lip 23 spaced from the protractor plate 11 and with it serving to form a groove in which the slide is accommodated as hereinafter described.

At a fixed distance from the zero reading point 19 of the linear scale 18, taken in the direction of the slide guides 22, is a point of origin 24, conveniently located on scale line 20, of a radiating intercept scale generally designated 25, graduated from zero minutes to sixty minutes. In this scale, the zero minute radiation is perpendicular to the scale line 20. The radiating lines of the intercept scale 25 allow the use of available mercatorial charts, as hereinafter described, whose scales may vary from one chart to another.

Figure 2:
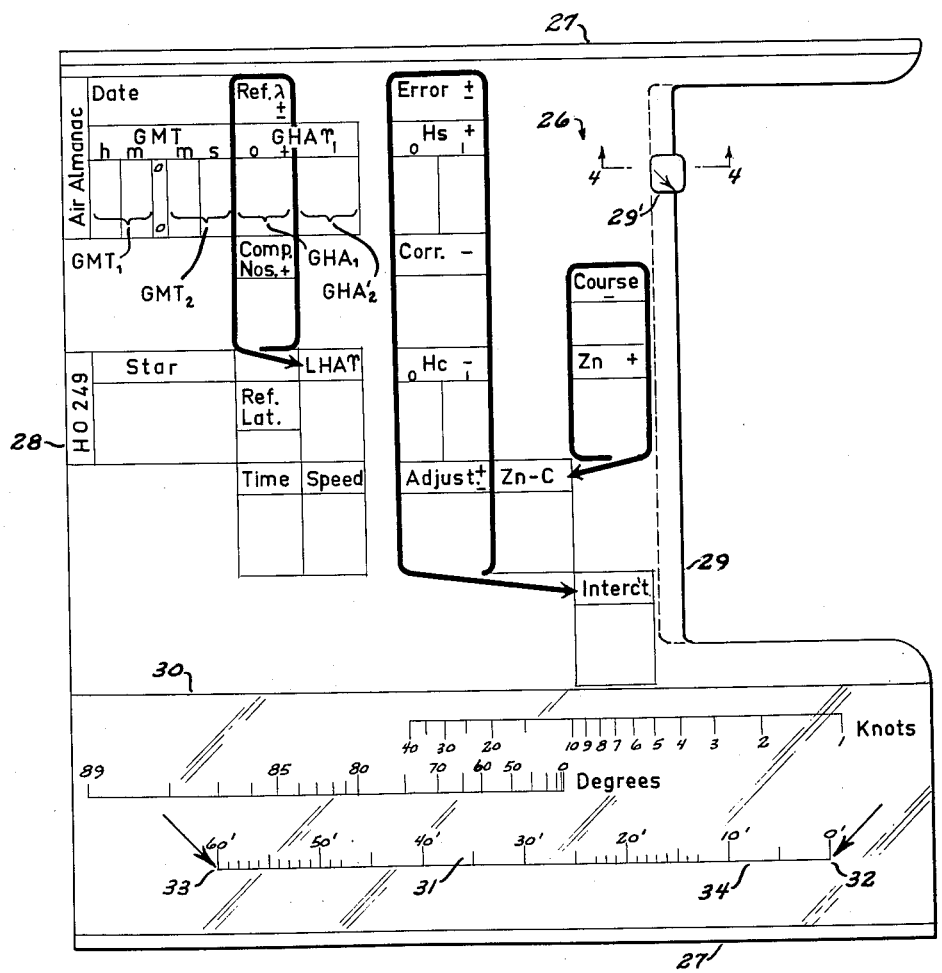
FIGURE 2 is a plan view of the slide therefor.
Figure 4:
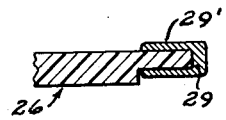
FIGURE 4 is a fragmentary sectional view taken along line 4—4 of FIGURE 2.

Referring now to FIGURE 2, there is shown a slide generally designated 26 which has parallel thinned upper and lower slide edges 27 receivable within the slide guides 22 as shown in FIGURE 3. Along the left edge of the slide 26 and perpendicular to the slide edges 27 is a straight edge 28 along which the line of position is drawn. Opposite the straight edge 28 and extending a portion of the height of the slide 26 for reading across the intercept scale 25 is a chart scale indicator edge 29. This edge 29 is removed from the straight edge 28 a fixed distance equal to the distance on the plate 11 from the protractor center 13 to the point of origin 24 of the radiations of the intercept scale 25. On the edge 29 is adjustably mounted a bent metal scale indicator clip 29', shown schematically.

The entire lower portion of the slide 26 beneath the indicator edge 25 and extending to the lower slide edge 27, is shown as a transparent area 30. This is provided for convenience in utilizing all of the scales shown on the slide, some of which are mere computing scales. However, it is particularly important that the transparent area 30 includes a portion in registration with the linear scale 18 of the protractor plate. In this portion a minutes-of-GHA Aries scale is linearly graduated for a length representing sixty minutes of GHA Aries opposite the length representing four minutes of time of the first linear scale 18 described on the protractor plate 11. The minutesof-GHA Aries scale is designated 31; this scale is graduated in a sense opposite the sense of the minutes-of-time scale 18. At the zero minute and sixty minute graduations are the index markers 32, 33, here shown as arrows, which are connected by a straight minutes-of-GHA Aries scale line 34. When the slide 26 is assembled within the slide guides 22 on the protractor plate 11, the minutes-of-GHA Aries scale line 34 will intersect the protractor center 13.

Certain supplementary scales and markings may conveniently be used in association with the parts heretofore described. These are inscribed on the device as mentioned hereinafter.

Referring to FIGURE 1: Aligned with the slide guides 22 are two spaced, parallel logarithmic scales, marked on the protractor plate 11 above the scale line 20. The upper of these scales represents time intervals in minutes. The lower scale represents distance in nautical miles.

Referring to FIGURE 2: A second pair of logarithmic scales are so located on the transparent area 30 of the slide 26 that they are in registration with these last-mentioned logarithmic scales on the plate 11. The upper scale represents speed in knots. The lower scale represents angular variation in degrees. Above the transparent area 30 is a tabular form that may be filled in for each problem and then erased or washed off. It includes headings, spaces and arrows which allow the convenient entry and manipulation of intermediate values arising in the solution of celestial navigation problems.

The manner in which the device heretofore described is utilized for solving the navigational problem is hereinafter described.

Three requisite steps in the solution of a celestial problem are, first, the mathematical determination of the intercept length and direction; secondly, the location of an initial point of reference known as the assumed position; and finally, the actual plotting of the required line-of-position by laying off from the assumed position the intercept length in the computed direction. The manner in which the device heretofore described is utilized in performing the above three steps and hence in solving the navigational problem is as follows:

In the first step the tabular computation form on the slide 26 is completely filled in for all sightings. Space is provided for six such sightings.

The form includes provision for the star name, sextant reading (Hs), sextant error, date, and the ship's course and speed. The Greenwich Mean Time (GMT) of observation, normally a six-digit figure (two figures each for the number of hours, minutes and seconds), is for the purpose of the plotter broken up into two three-digit figures, hereinafter called $GMT_1$ and $GMT_2$. $GMT_1$ represents the number of hours and the tens of minutes of the Greenwich Mean Time of an observation; $GMT_2$ represents the number of units of minutes and the seconds. Reference to published tables gives the proper correction value (Corr.) normally applied to Hs for dip and refraction.

The reference latitude (Ref. Lat.) is that whole degree parallel of latitude which comes closest to the vessel's dead-reckoned position; the reference longitude (Ref. λ) is that whole degree meridian that comes closest to the dead-reckoned position.

The compensating number (Comp. No.) is selected for each sight in accordance with the following rule: If the value of $GMT_2$ lies between $0^m00^s$ and $3^m59^s$ inclusive, select 1 as the compensating number; if between $4^m00^s$ and $7^m59^s$ inclusive, select 2; if between $8^m00^s$ and $9^m50^s$ inclusive, select 3. The explanation for this rule is to be given later.

The Greenwich Hour Angle of Aries (GHA ϒ) is found in the Air Almanac, a U.S. Naval Observatory publication, using $GMT_1$ and the date as entries. The value of GHA Aries is entered exactly as it appears in the tables. The customary interpolation is not performed.

For the purposes of this plotter GHA Aries, normally a five-digit figure, is divided into $GHA_1$ representing the number of degrees and $GHA'_2$ representing the number of minutes.

The Local Hour Angle of Aries (LHA ϒ) for each sight is determined by adding algebraically the compensating number, $GHA_1$, and the reference longitude. Since each term in the addition is a whole degree value, LHA Aries is always a whole degree value.

The computed altitude (Hc) and azimuth angle (Zn) are found in a U.S. Navy Hydrographic Office publication entitled Hydrographic Office No. 249, vol. 1; using LHA Aries, the reference latitude, and the name of the star as entries.

In order to adjust all lines of position for a group of sightings to the time of the last observation recorded, the following additional entries are made on the computation form. The number of degrees of the vessel's course is subtracted from the value of the azimuth angle and the absolute value of the difference is recorded under $Zn-C$. If $Zn-C$ is greater than 90°, it is then reduced to a first quadrant angle by subtracting it from 180°, subtracting 180° from it, or subtracting it from 360°, whichever is appropriate.

The time-of-travel (time) for each sight is the interval to the nearest whole minute between the time of the subject sight to the time of the last sight.

The adjustment for ship's travel is found by means of the logarithmic scale as follows: The speed of the vessel in knots on the upper log scale on the slide 26 is aligned with the time-of-travel on the upper log scale on the plate 11. The value of the adjustment on the lower log scale on the plate is then read opposite the value of $Zn-C$ on the lower log scale of the slide 26.

Referring to FIGURE 3, in the translation of the slide 26 relative to the plate 11, the upper and lower slide edges 27 are held in alignment by the plate slide guides 22 while restrained in the direction perpendicular to the plane of the plate by the guide overhanging lip 23.

The sense of the adjustment is determined by the following rule: The adjustment is considered positive if the value of $Zn-C$ lies between 0° and 90° inclusive or between 270° and 360°; negative if between 91° and 269° inclusive.

The value of the intercept, adjusted for ship's travel (later referred to herein as $a+d$), is then found by adding algebraically the following terms: Hs (considered positive), the correction (always negative), the sextant error (positive or negative) Hc (considered negative), and the adjustment (positive or negative as described above). The intercept so found for each sighting is entered on the computation form and the appropriate sense noted.

Thus the intercept length, and its direction (Zn), are mathematically determined and the first step in the solution completed.

The second step in the solution of a celestial problem is the location of the assumed position on a navigation chart, conveniently of mercator projection. Two criteria must be satisfied by a point on a chart that is to be used as an assumed position: First, that with respect to a particular observation, LHA Aries is a whole degree value; and secondly, that the point lie on a whole degree parallel of latitude relatively near the dead-reckoned position of the vessel at the time of the observation.

The manner in which the device locates the pivot pin 14 over a point on a mercator chart, that satisfies these two criteria, is explained as follows:

By definition: LHA Aries=GHA Aries−Longitude

Using $LHA_1$ to denote the number of degrees of LHA Aries, and $LHA_2$ to denote the number of minutes of LHA Aries in such manner that:

LHA Aries=$LHA_1+LHA_2$ and similarly, $$\text{GHA Aries} = \text{GHA}_1 + \text{GHA}_2$$

and $$\text{Longitude} = \text{Long}_1 + \text{Long}_2$$

Then, $$\text{LHA}_1\ \text{LHA}_2 = \text{GHA}_1 + \text{GHA}_2 - \text{Long}_1 - \text{Long}_2$$

which may be broken down to $$\text{LHA}_1 = \text{GHA}_1 - \text{Long}_1$$

and $$\text{LHA}_2 = \text{GHA}_2 - \text{Long}_2$$

since, by definition, at the assumed position $\text{LHA}_2 = 0$, at this point $$\text{GHA}_2 - \text{Long}_2 = 0$$

or, $$\text{GHA}_2 = \text{Long}_2$$

In that $\text{GHA}_2$ is not given directly in the Almanac Tables it was found useful to break this value up into its tabular and interpolative components to be noted as $\text{GHA}'_2$ and $\text{GHA}''_2$, so that $$\text{GHA}_2 = \text{GHA}'_2 + \text{GHA}''_2 = \text{Long}_2$$

Thus it may be seen that the first criteria for an assumed position is satisfied by a point distant from a whole degree meridian by a length representing the sum of $\text{GHA}'_2$ and $\text{GHA}''_2$.

Referring to FIGURE 5, it may be seen that the plotter generates this length to a fixed scale when $\text{GHA}'_2$ on the minutes-of-GHA Aries scale 31 is aligned with $\text{GHA}''_2$ on the minutes-of-time scale 18. By projection the length, thus found, is converted into a projection $x$ that represents the sum of $\text{GHA}'_2$ and $\text{GHA}''_2$ at the scale of the particular chart being used.

FIGURE 5 diagrammatically shows the minutes-of-time scale 18 of the plate 11 and the minutes-of-GHA Aries scale 31 of the extended slide 26, in place on a mercatorial chart. It may be seen that this length above referred to is generated between the zero index 32 on the slide 26 and the zero index 19 on the plate 11 when $\text{GHA}'_2$ on the minutes-of-GHA Aries scale 31 is aligned with $\text{GHA}''_2$ on the minutes-of-time scale 18, seen through the slide transparent area 30.

Furthermore, if the device is so tilted and positioned over the chart that, as seen through the plate window 21, the left index 33 on the slide 26 is over the designated reference longitude, that the right index 32 is over the meridian 1° east of the reference longitude, and that the pivot pin 14 is aligned on the reference latitude, then the length $\text{GHA}'_2 + \text{GHA}''_2$ produced on the tilted scale lines 20 and 34 is projected on the reference latitude, and the projection $x$, as marked on FIGURE 5, is representative of the sum at the chart scale. It thus follows that the pivot pin 14 has been located at a point that satisfies the first criteria for the assumed position. It remains to be shown that the position of the pin also satisfies the second criteria.

Referring once again to FIGURE 5, it is apparent first that the device is so positioned on the chart that the pin 14 is on the reference latitude, and secondly, that the length $x$ is measured westward from a point 1° east of the reference longitude. Since the variation in the length of $x$ is between 0° and 2°, the pin 14 is never farther removed from the reference longitude than 1° east or west. Thus it has been shown that by the use of the minutes-of-time scale 18 and the minutes-of-GHA Aries scale 31, and by the proper manipulation of the device on a navigation chart, the pivot pin 14 of the device may be so positioned that its location satisfies the two criteria for an assumed position.

It may be noted that every point on the minutes-of-time scale 18 is representative of two or three values of time differing from one another by an increment of four minutes time or 1° GHA Aries. It is therefore necessary to correct the calculations involving GHA Aries for the particular row of scale values used. A second correction must be made to compensate for measuring $x$ from a point 1° east of the reference longitude. These two corrections are combined in a single entry called the compensating number, which is determined in accordance with the rule already given.

The third step, as previously mentioned, is the plotting of the line-of-position by laying off from the assumed position (as located in the second step) the intercept vector as mathematically determined in the first step. However, prior to plotting, the device must have been adapted for the scale of the chart. This is accomplished by removing the slide 26 from the protractor plate 11, positioning the slide on the chart so that the minutes-of-GHA Aries scale line 34 coincides with the reference latitude line; and affixing the scale indicator clip 29' at a distance $y$ along the chart scale indicator edge 29, where it is intersected by the parallel of latitude 1° north of the reference latitude. The slide is then reinserted in the protractor plate.

For plotting from the assumed position, found as above, the device is next pressed downward against the chart so that the pin 14 is engaged in the chart surface at the assumed position, with sufficient security to permit the device to be pivoted. Coincident with the pin is the protractor center 13. Referring to FIGURE 6, it may be seen that as the device is pivoted about the pin 14, the azimuth angle Zn is generated between the direction of true north on the chart and the slide edge 27. Furthermore, from the geometry of the figure, this generated angle remains equal to a second angle generated between the reference latitude and the cut-out edge 12, which angle is in turn readable along the protractor scale 15 where intersected by the reference latitude.

The radiating lines of the intercept scale 25 are so drawn that at any level its width is divided into equal divisions. Thus, after the indicator clip 29' is properly set for the scale of the mercatorial chart, translating movement across the intercept scale 25 may be read in terms of minutes of latitude, correctly measured at the scale of the chart.

Therefore, the slide 26 is translated until the indicator clip 29' points to the radiating line which corresponds to the adjusted intercept value. This slide translation, $a+d$, measured from the zero line of the intercept scale 25, is the same in direction and magnitude as the displacement of the straight edge 28 from its zero position. Thus the intercept direction and length may be measured off from the assumed position by readings made along the protractor scale 15 and the intercept scale 25 respectively; and the straight edge 28 passes through the intercept vector end point at an angle perpendicular to the vector.

Also in FIGURE 6 the trigonometric relationship between the vessel travel vector and its component $d$ in the Zn direction is shown:

$$a+d = \text{adjusted intercept}$$
$$d = \text{vessel travel} \times \cos (Zn - \text{course})$$

or $$d = \text{speed of vessel} \times \text{time interval} \times \cos (Zn - C)$$

or $$\log d = \log \text{speed} + \log \text{time} + \log \cos (Zn - C)$$

This last expression is the basis for the method by which the adjustment for ship's travel is found on the log scales computed as described above.

In actual practice the indicator clip setting is made prior to beginning the second step, the pivot pin is applied to the chart at the assumed position in the second step, and the device is manipulated about the fixed pin 14 to plot the line of position in the third step. The detailed third step procedure is as follows:

Keeping the pivot pin 14 at the assumed position, the slide 26 is translated until the value of the intercept, $a+d$, is read on the intercept scale 25 at the indicator clip 29'. The device is then rotated about the pin until the value of Zn on the protractor scale 15 is aligned with the reference latitude line. Two rules must be observed with regard to this rotation. First, if the intercept value is positive, the inner protractor scale 17 is used; if negative, the outer scale 16 is used. Secondly, the value of Zn is positioned over the reference latitude to either the left or right of the pin, whichever manner satisfies the requirement that the printed protractor figures bracketing the Zn value appear right side up. With the plotter so rotated, a pencil is drawn over the chart along the straight-edge 28. The pencil line so produced on the chart is the line of position of a celestial body adjusted to the time of the last observation.

Repeating the plotting procedure for the remaining sights results in intersecting lines of position, which fix the position of the vessel.

Modifications of the device described will occur to those skilled in the art. This specification is not to be construed narrowly, but rather as broadly co-extensive with the scope of the claims which follow.

I claim:

1. A navigation plotter for laying out a plurality of intersecting lines of position directly upon a navigation chart, comprising a protractor plate having a protractor center, pivot means at said center, a slide guide, a slide translatable with respect to said slide guide and having a straight edge perpendicular to the slide guide, and protractor markings on the plate including graduations about a 180° angle, each graduation representing two angles whose difference equals 180°, together with a first set of angle-designating numerals marked adjacent the successive graduations, each of which numerals is upright when horizontally aligned with the center at one side thereof, and a second set of angle-designating numerals marked adjacent the successive graduations, each of which numerals is upright when horizontally aligned with the center at the other side thereof.

2. For use with navigation charts of various scales, a navigation plotter for laying out lines of position directly upon such charts comprising a plate having a pivot center, a slide guide, and a first linear scale arranged parallel to the slide guide, together with a slide translatable within said slide guide and having a second linear scale adjacent and additive to the first linear scale, one of said scales being graduated by the minutes of a degree of angularity, the other of said scales being graduated in the opposite sense and by minutes of time and so proportioned that its length corresponding to four minutes of time equals the length graduated on the other scale for sixty minutes of a degree, the slide having two translational setting indices spaced from each other the amount of said length, said indices being along a line parallel to the slide guide and which intersects the pivot center, together with a straight edge perpendicular to the slide guide, means to affix the straight edge at a range of chosen distances from the center starting with zero distance, and protractor markings on the plate including graduations about a 180° angle, each graduation representing two angles whose difference equals 180°.

References Cited in the file of this patent

UNITED STATES PATENTS

| | | |
|---|---|---|
| 1,713,025 | Castleman | May 14, 1929 |
| 2,004,951 | Jensen | June 18, 1935 |
| 2,156,524 | Christensen | May 2, 1939 |
| 2,300,448 | Ludwig | Nov. 3, 1942 |
| 2,390,622 | Stanton | Dec. 11, 1945 |
| 2,415,277 | Caston | Feb. 4, 1947 |
| 2,425,097 | Isom | Aug. 5, 1947 |
| 2,547,955 | Marsh | Apr. 10, 1951 |
| 2,632,963 | Drury | Mar. 31, 1953 |

FOREIGN PATENTS

| | | |
|---|---|---|
| 190,823 | Germany | Nov. 8, 1907 |
| 306,241 | Germany | June 25, 1918 |
| 247,822 | Great Britain | Feb. 25, 1926 |
| 721,444 | Great Britain | Jan. 5, 1955 |